United States Patent
Lee et al.

(10) Patent No.: US 12,229,944 B2
(45) Date of Patent: Feb. 18, 2025

(54) DEFECT DETECTION METHOD OF DEEP LEARNING-BASED SEMICONDUCTOR DEVICE AND SEMICONDUCTOR ELEMENT MANUFACTURING METHOD INCLUDING THE DEFECT DETECTION METHOD

(71) Applicant: Samsung Electronics Co., Ltd., Suwon-si (KR)

(72) Inventors: Kyenhee Lee, Seoul (KR); Mincheol Kang, Hwaseong-si (KR); Sooryong Lee, Seoul (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 328 days.

(21) Appl. No.: 17/842,206

(22) Filed: Jun. 16, 2022

(65) Prior Publication Data
US 2023/0169641 A1     Jun. 1, 2023

(30) Foreign Application Priority Data

Nov. 30, 2021    (KR) .................. 10-2021-0169342

(51) Int. Cl.
*G06T 7/00*     (2017.01)
*G06N 3/04*     (2023.01)
(Continued)

(52) U.S. Cl.
CPC ............. *G06T 7/001* (2013.01); *G06N 3/045* (2023.01); *G06T 7/11* (2017.01); *G06T 7/97* (2017.01);
(Continued)

(58) Field of Classification Search
None
See application file for complete search history.

(56) References Cited

U.S. PATENT DOCUMENTS

| 8,526,710 B2 | 9/2013 | Nakagaki et al. |
| 10,546,374 B2 | 1/2020 | Onishi et al. |
| (Continued) | | |

FOREIGN PATENT DOCUMENTS

JP     2009130026 A    *   6/2009

OTHER PUBLICATIONS

English translation of JP-2009130026-A. (Year: 2009).*

*Primary Examiner* — Thomas D Lee
(74) *Attorney, Agent, or Firm* — Harness, Dickey & Pierce, P.L.C.

(57) ABSTRACT

The inventive concept provides a defect detection method of a semiconductor element, capable of promptly and accurately detecting a defect, and predicting a type of the defect with respect to various defects of the semiconductor element, and a semiconductor element manufacturing method including the defect detection method. The defect detection method is capable of promptly and accurately detecting the defect, and predicting the type of the defect with respect to various defects of the semiconductor element, by generating a first segmentation image and a second segmentation image; converting the first segmentation image and the second segmentation image into an image of a first color and a second color, respectively; generating a combination image; classifying the type of a defect; generating a defect detection model by using deep learning, and detecting a defect of the semiconductor element by using a defect detection process using the defect detection model.

20 Claims, 15 Drawing Sheets

(51) Int. Cl.
*G06N 3/045* (2023.01)
*G06T 7/11* (2017.01)

(52) U.S. Cl.
CPC .......... *G06T 2207/10024* (2013.01); *G06T 2207/10061* (2013.01); *G06T 2207/20081* (2013.01); *G06T 2207/20084* (2013.01); *G06T 2207/20221* (2013.01); *G06T 2207/30148* (2013.01)

(56) References Cited

U.S. PATENT DOCUMENTS

| | | |
|---|---|---|
| 10,818,004 B2 | 10/2020 | Iwanaga |
| 10,825,650 B2 | 11/2020 | Chou et al. |
| 2008/0285840 A1 | 11/2008 | Kawai |
| 2019/0026881 A1* | 1/2019 | Sato .......................... G06T 7/90 |
| 2021/0133989 A1 | 5/2021 | Bhattacharyya et al. |
| 2021/0364450 A1* | 11/2021 | Lauber ....................... G06T 5/60 |
| 2022/0108436 A1* | 4/2022 | Kang ......................... G06T 7/10 |
| 2024/0289945 A1* | 8/2024 | Buzaglo ................... G06T 7/001 |

\* cited by examiner

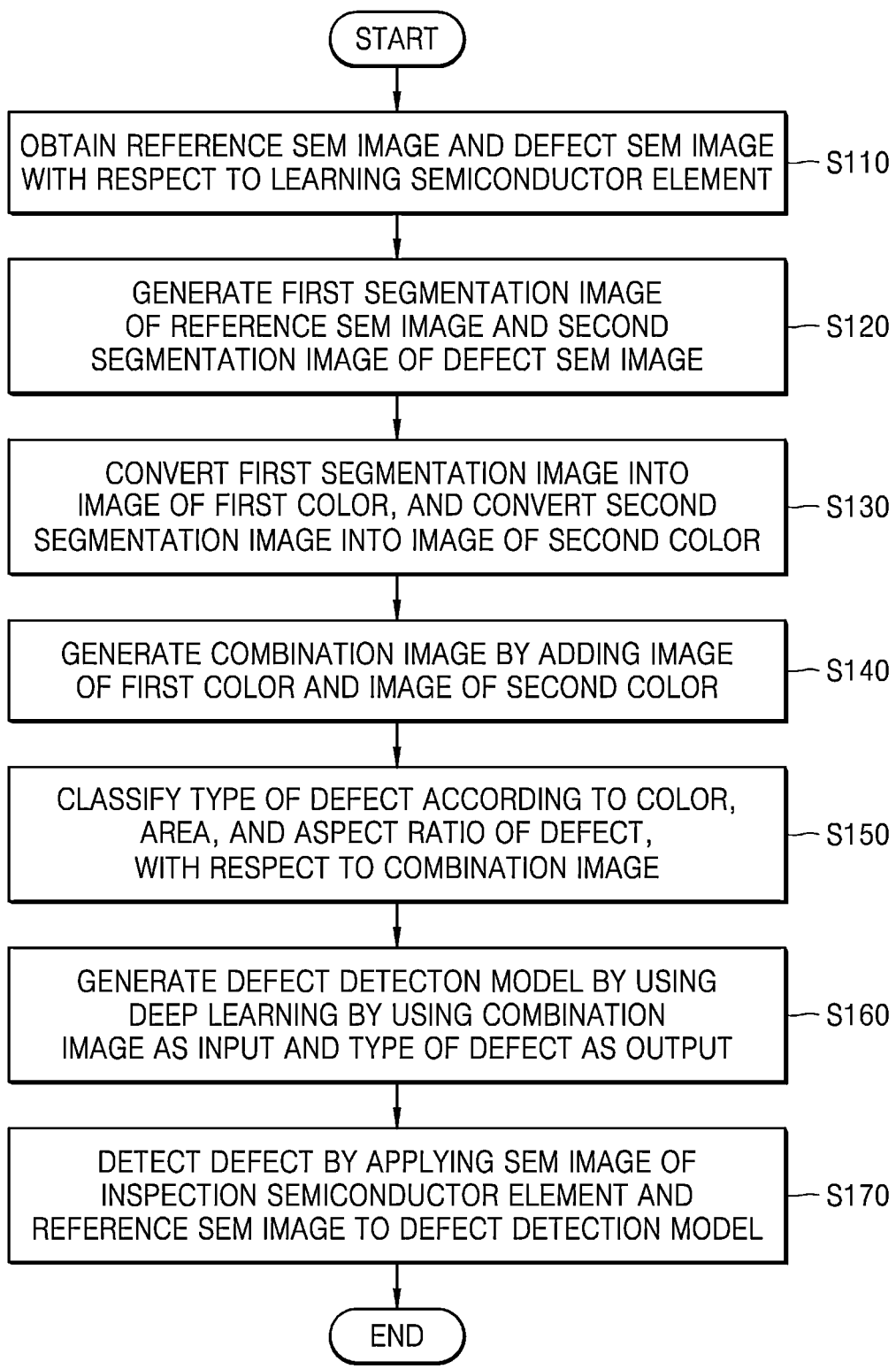

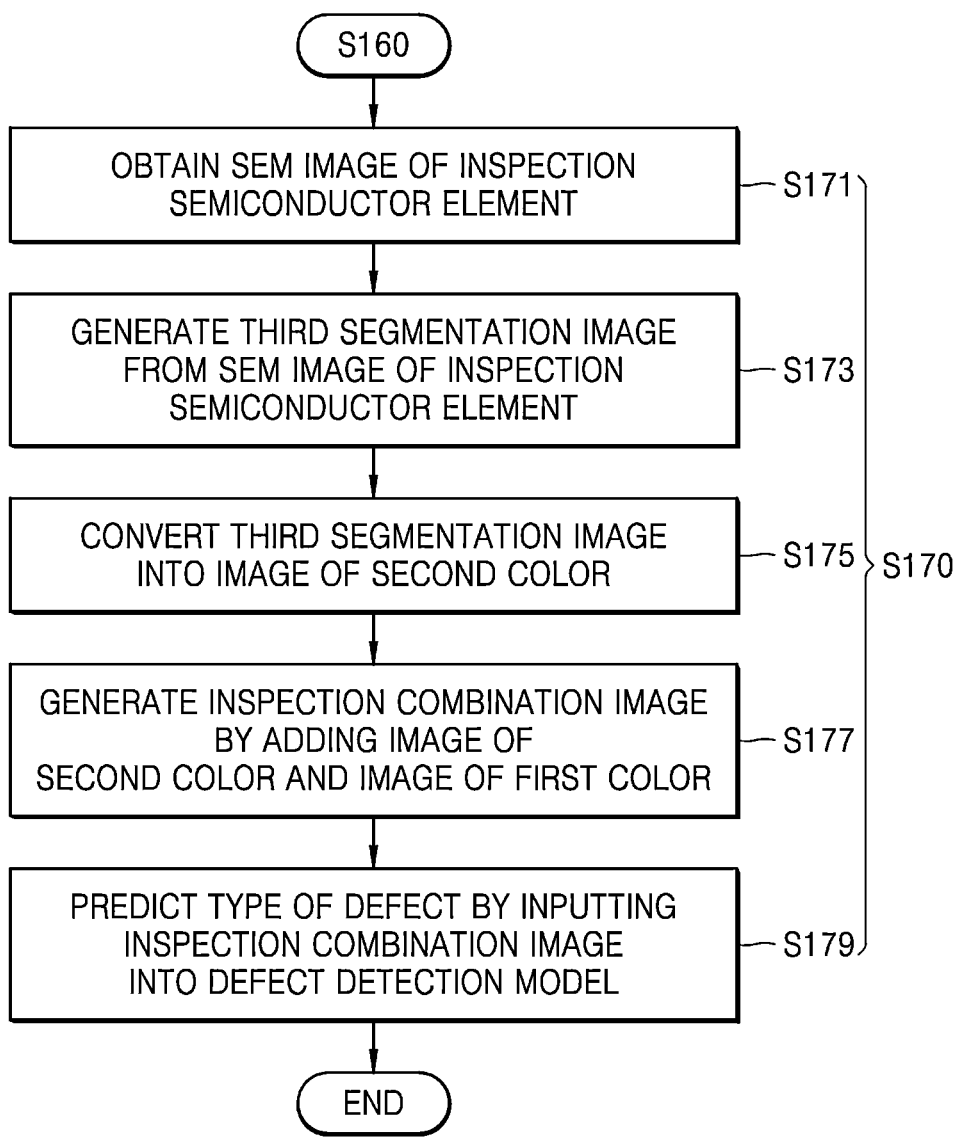

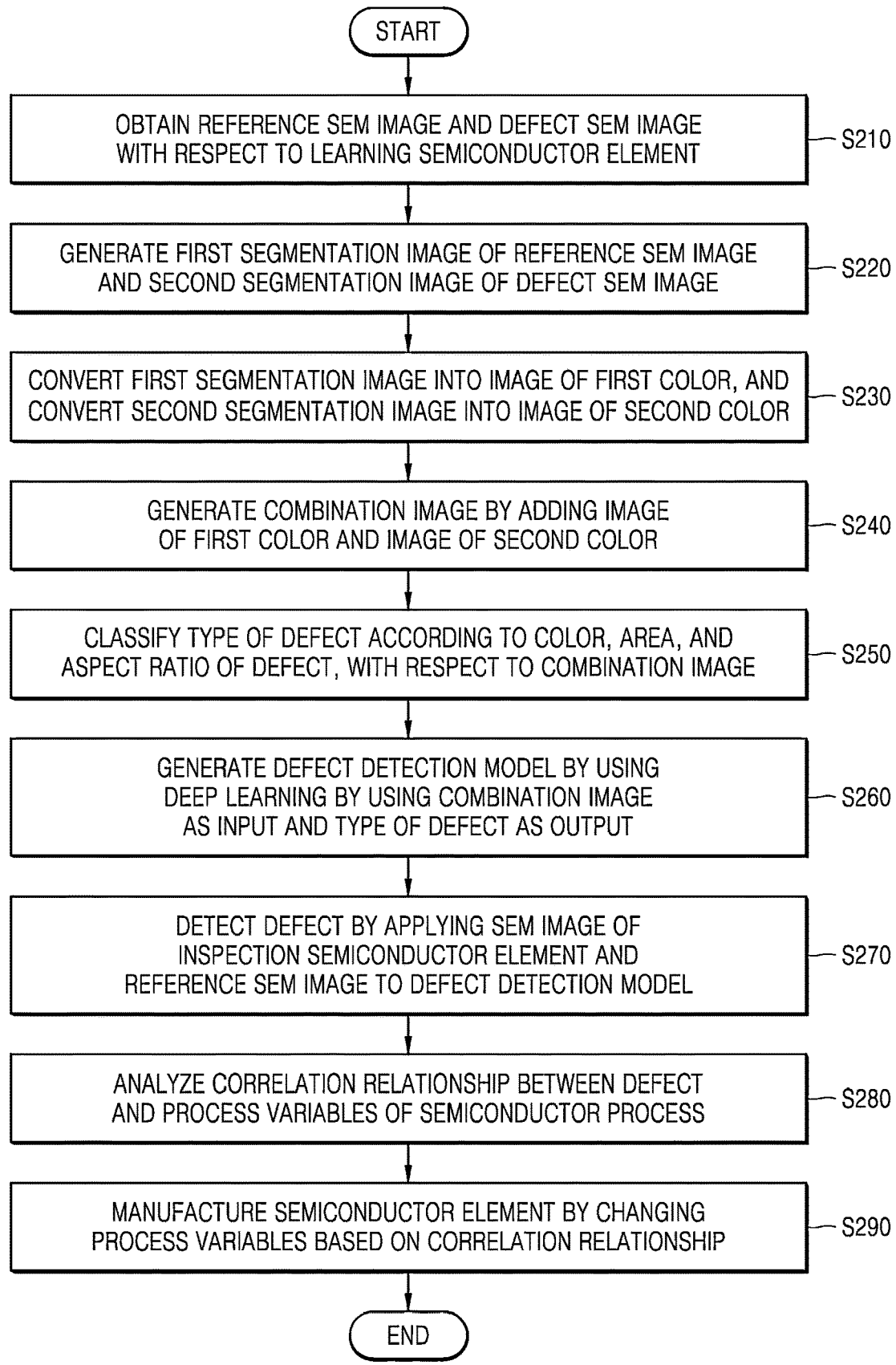

DEFECT DETECTION METHOD OF DEEP LEARNING-BASED SEMICONDUCTOR DEVICE AND SEMICONDUCTOR ELEMENT MANUFACTURING METHOD INCLUDING THE DEFECT DETECTION METHOD

CROSS-REFERENCE TO RELATED APPLICATION

This application is based on and claims priority under 35 U.S.C. § 119 to Korean Patent Application No. 10-2021-0169342, filed on Nov. 30, 2021 in the Korean Intellectual Property Office, the disclosure of which is incorporated by reference herein in its entirety.

BACKGROUND

The inventive concepts relate to a semiconductor element manufacturing method, and more particularly, to a defect detection method of detecting a defect of a semiconductor element and a semiconductor element manufacturing method including the defect detection method.

The core of a semiconductor process is technology that draws circuit patterns on silicon wafers. As the degree of integration of semiconductor process increases and the line width and/or critical dimensions (CD) becomes finer, types, amounts, and consequence of defects of the semiconductor elements are increasing exponentially. Due to these reasons, technologies for detecting and predicting the defects of semiconductor elements are being studied. Among these technologies, there is technology to detect a defect and/or predict a type of the defect by comparing an image of a target pattern to be transferred to a wafer to a scanning electron microscope (SEM) image of a pattern actually transferred to the wafer and formed on the wafer, measured by using an inspection device, and by using the intensity difference between the two images. However, because the technology detects a defect only by using the intensity difference between the two images to predict the type of the defect, there are limitations in accurate defect detection and type prediction for various defects of semiconductor elements.

SUMMARY

The inventive concepts provide a defect detection method of a semiconductor element, capable of promptly and accurately detecting a defect, and predicting a type of the defect with respect to various defects of the semiconductor element, and a semiconductor element manufacturing method including the defect detection method.

In addition, the issues to be solved by the technical idea of the inventive concepts are not limited to those mentioned above, and other issues may be clearly understood by those of ordinary skill in the art from the following descriptions.

According to an aspect of the inventive concepts, there is provided a deep learning-based defect detection method for a semiconductor element including: generating a first segmentation image from a reference scanning electron microscope (SEM) image without a defect and a second segmentation image from a defect SEM image with the defect, with respect to a learning semiconductor element; converting the first segmentation image into an image of a first color among a red color, a green color, or a blue color, and converting the second segmentation image into an image of a second color, different from the first color, among the red color, the green color, or the blue color; generating a combination image by adding the image of the first color and the image of the second color; classifying a type of the defect in the learning semiconductor element according to at least one among a color and an aspect ratio of the defect, with respect to the combination image; generating, using deep learning, a defect detection model using the combination image as an input and the type of the defect as an output; and detecting a defect in an inspection semiconductor element by applying an SEM image of the inspection semiconductor element and the reference SEM image to the defect detection model, wherein the first segmentation image and a second segmentation image correspond to SEM images of a segmentation region, in which an intensity difference between the reference SEM image and the defect SEM image is higher than a reference value.

According to another aspect of the inventive concepts, there is provided a deep learning-based defect detection method for a semiconductor element including: obtaining a reference scanning electron microscope (SEM) image without a defect and a defect SEM image with the defect, with respect to a learning semiconductor element; generating a first segmentation image of the reference SEM image and a second segmentation image of the defect SEM image, which correspond to a segmentation region, in which an intensity difference between the reference SEM image and the defect SEM image is higher than a reference value; converting the first segmentation image into an image of a first color, which is one color among a red color, a green color, or a blue color, and converting the second segmentation image into an image of a second color, different from the first color, among the red color, the green color, or the blue color; generating a combination image by adding the image of the first color and the image of the second color; classifying a type of the defect in the learning semiconductor element according to a color, an area, and an aspect ratio of the defect, with respect to the combination image; generating, using a deep learning, a defect detection model based on a generative adversarial network (GAN) algorithm using the combination image as an input and the type of the defect as an output; and detecting a defect in an inspection semiconductor element by applying an SEM image of the inspection semiconductor element and the reference SEM image to the defect detection model.

Furthermore, according to another aspect of the inventive concepts, there is provided a semiconductor element manufacturing method including: obtaining a reference scanning electron microscope (SEM) image without a defect and a defect SEM image with a defect, with respect to a learning semiconductor element; generating a first segmentation image of the reference SEM image and a second segmentation image of the defect SEM image, which correspond to a segmentation region, in which an intensity difference between the reference SEM image and the defect SEM image is higher than a set reference value; converting the first segmentation image into an image of a first color, which is one color among a red color, a green color, or a blue color, and converting the second segmentation image into an image of a second color, different from the first color, among the red color, the green color, or the blue color; generating a combination image by adding the image of the first color and the image of the second color; classifying a type of the defect in the learning semiconductor element according to a color, an area, and an aspect ratio of the defect, with respect to the combination image; generating, using deep learning, a defect detection model based on a generative adversarial network (GAN) algorithm using the combination image as an input and the type of the defect as an output; detecting a defect in an inspection semiconductor element by applying an SEM image of the inspection semiconductor element and the reference SEM image to the defect detection model; analyzing a correlation relationship between the detected defect and process variables of a semiconductor process; changing, based on the correlation relation, at least one of the process variables causing the defect; and manufacturing the semiconductor element based on the changed process variables.

BRIEF DESCRIPTION OF THE DRAWINGS

Example embodiments of the inventive concepts will be more clearly understood from the following detailed description taken in conjunction with the accompanying drawings in which:

FIG. 1 is a conceptual flowchart of a deep learning-based defect detection method for a deep learning-based semiconductor element, according to some example embodiments;

FIG. 6 is a flowchart of further subdivided operations of an operation of detecting a defect, in the defect detection method of FIG. 1; and FIG. 7 is a schematic flowchart of processes of a semiconductor element manufacturing method including the defect detection method according to some example embodiments.

DETAILED DESCRIPTION OF THE EMBODIMENTS

Figure 2A:
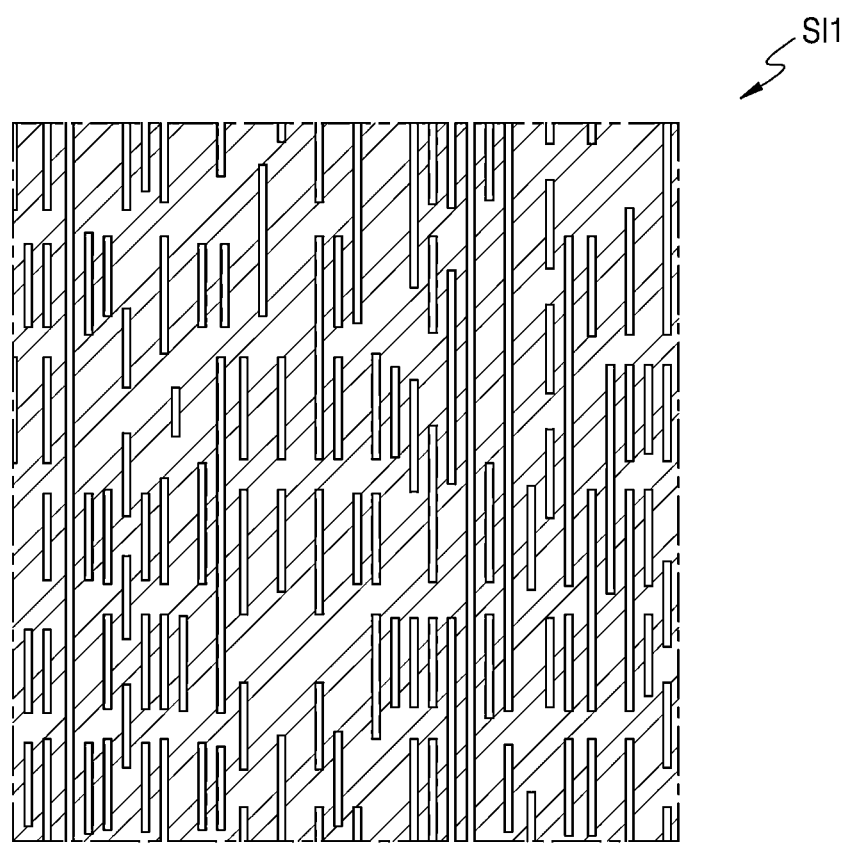
FIGS. 2A through 2E are plan views of example patterns for describing an operation of generating a combination image in an operation of generating a second segmentation image, in the defect detection method of FIG. 1.

Hereinafter, some example embodiments of the inventive concepts will be described in detail with reference to the accompanying drawings. Identical reference numerals are used for the same constituent elements in the drawings, and duplicate descriptions thereof are omitted.

Figure 2B:
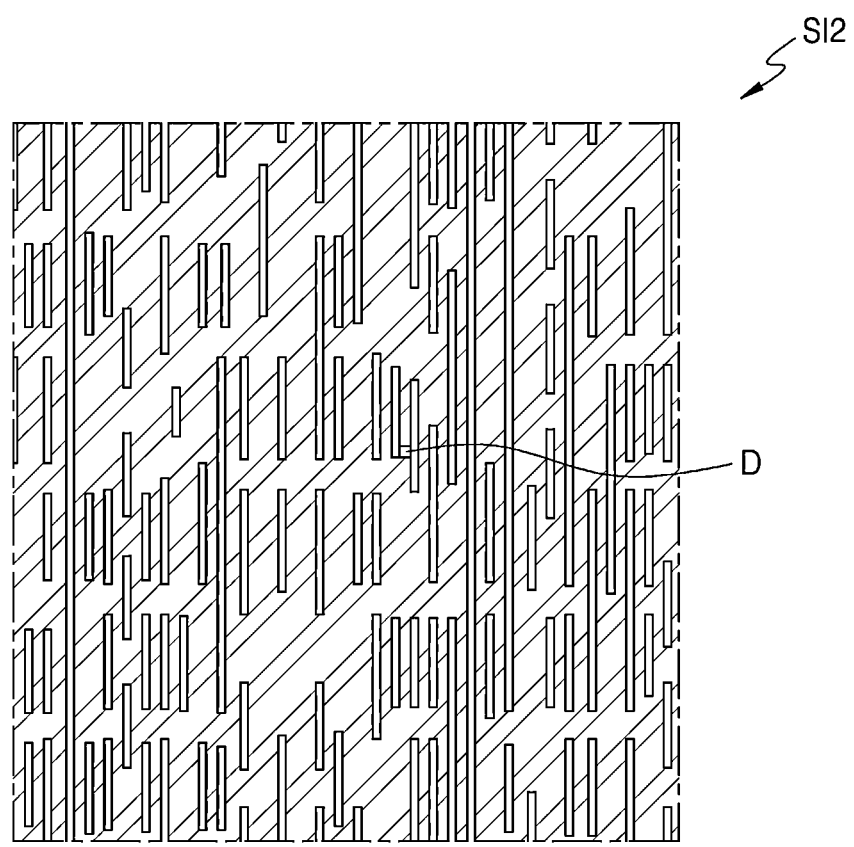
Figure 2C:
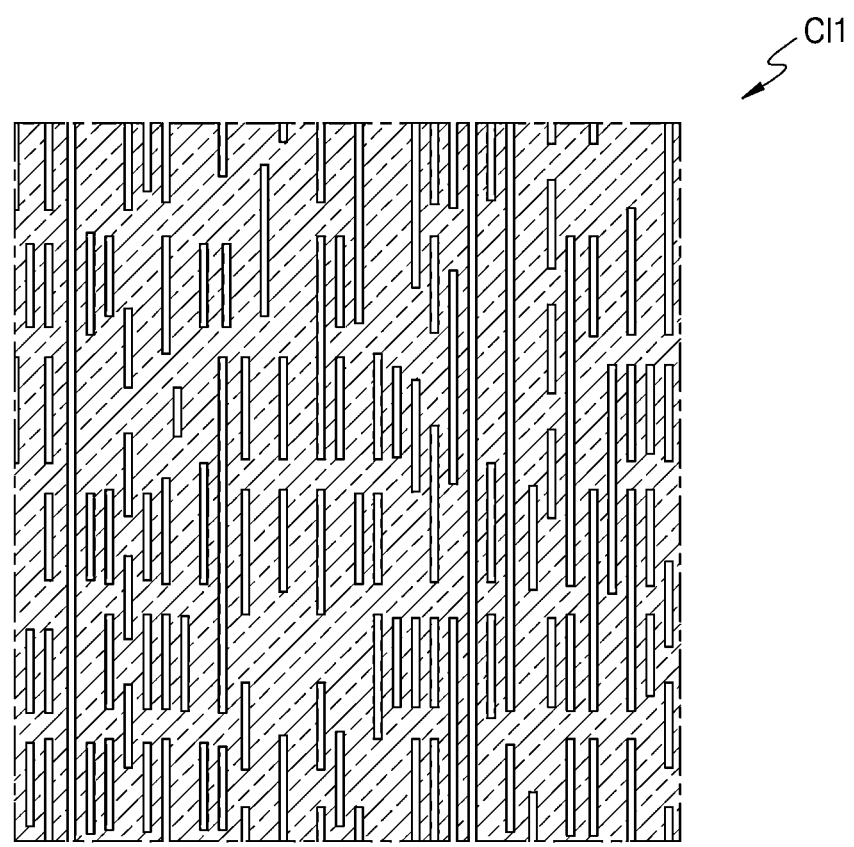
Figure 2D:
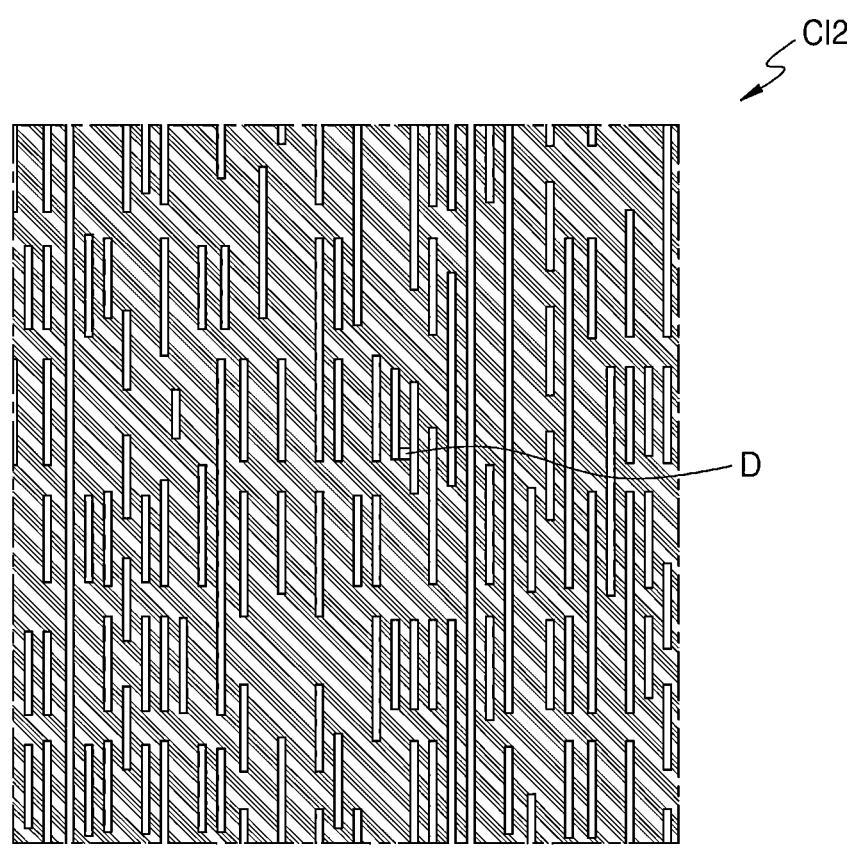
Figure 2E:
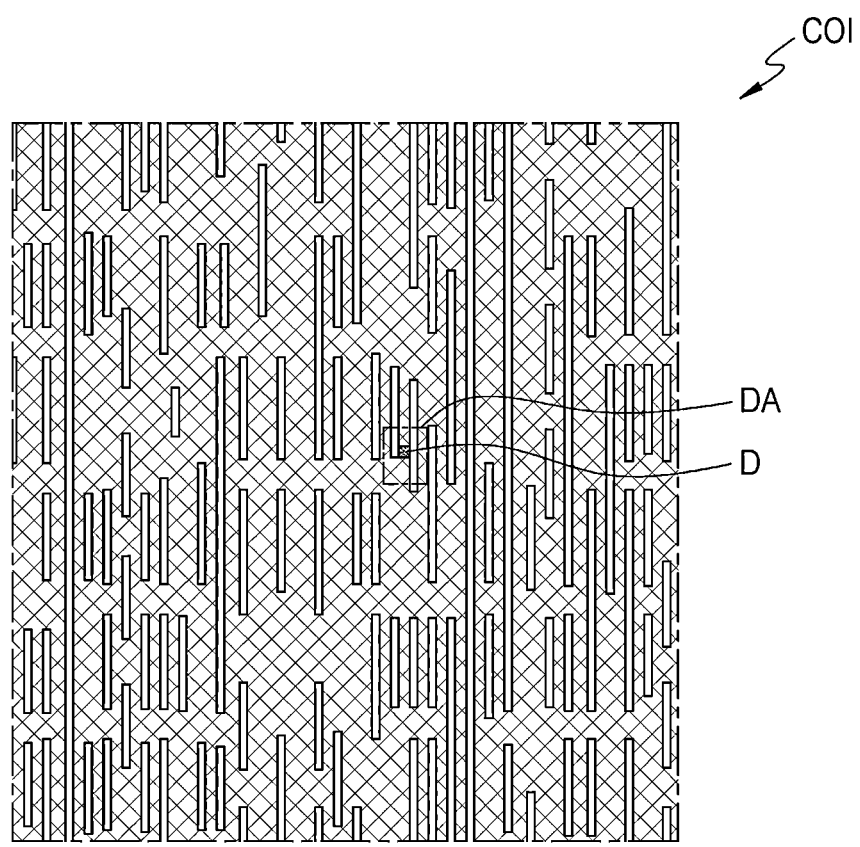
Figure 3:
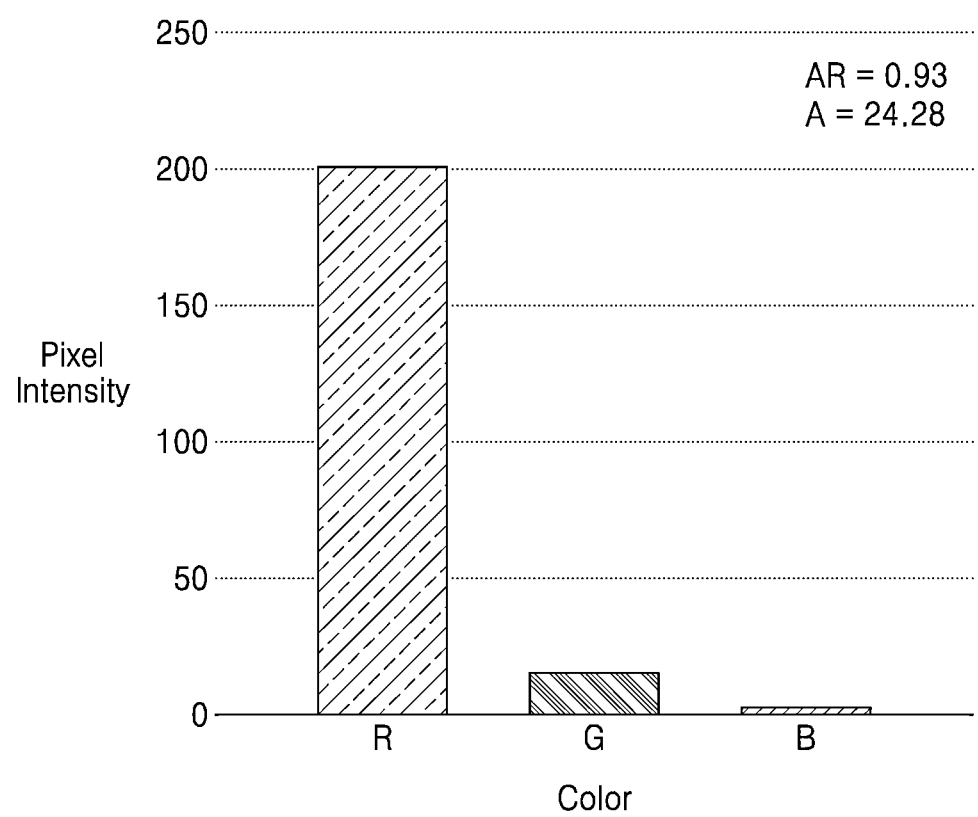
FIG. 3 is a graph explaining an operation of classifying a type of a defect in the defect detection method of FIG. 1.

FIG. 1 is a conceptual flowchart of a deep learning-based defect detection method for a semiconductor element, according to some example embodiments, FIGS. 2A through 2E are plan views of example patterns for describing an operation of generating a combination image in an operation of generating a second segmentation image, in the defect detection method of FIG. 1, and FIG. 3 is a graph explaining an operation of classifying a type of a defect in the defect detection method of FIG. 1.

Referring to FIG. 1, the deep learning-based defect detection method for semiconductor element of the example (hereinafter, simply referred to as 'defect detection method') may firstly obtain a reference scanning electron microscope (SEM) image and a defect SEM image with respect to a learning semiconductor element (S110). Herein, the learning semiconductor element may mean a semiconductor element used for generating a defect detection model (e.g., using deep learning). In addition, the learning semiconductor element may include a reference learning semiconductor element and a defect learning semiconductor element. On the reference learning semiconductor element and the defect learning semiconductor element, substantially identical patterns may be formed. However, the reference learning semiconductor element may include a semiconductor element including no defect, and the defect learning semiconductor element may include a semiconductor element including a defect. For example, when a target pattern is formed on a semiconductor element, such as a wafer, the target pattern may not be accurately formed on the semiconductor element due to various issues in a semiconductor process, and a defect may occur in the target pattern. For example, a representative defect of a pattern may include a pinch defect in which a pattern is thinning and/or broken and/or a bridge defect in which a pattern is thickened and/or adjacent patterns are attached to each other. For example, the pinch defect may include a thinning defect, in which a corresponding portion of a pattern is thinned, and the bridge defect may include a fat defect, in which a corresponding portion of a pattern is thickened. However, the example is not limited thereto. For example, the type of the defect of a pattern is not limited to a pinch defect and/or a bridge defect described above.

In some example embodiments, the reference SEM image may be an image, taken by using an SEM, of the reference learning semiconductor element, and the defect SEM image may be an image, taken by using an SEM, of the defect learning semiconductor element. In these cases, a semiconductor element may include any one of a plurality of chips included on a wafer. An SEM image may have various sizes according to field of view (FOV) of the SEM. For example, the SEM image may be and/or include an image, taken by using an SEM, of a portion of a chip corresponding to a semiconductor element.

Referring to FIGS. 1, 2A, and 2B, after the reference SEM image and the defect SEM image of the learning semiconductor element are obtained, a first segmentation image of the reference SEM image and a second segmentation image of the defect SEM image may be generated (S120). A segmentation image may mean an SEM image of a segmentation region, in which an intensity difference between the reference SEM image and the defect SEM image is higher than a set reference value. As described above, because the reference SEM image and the defect SEM image include the SEM images of the learning semiconductor element including identical patterns, other segmentation regions may have substantially identical intensity, except for a segmentation region including the defect. In these cases, each of the reference SEM image and the defect SEM image may be segmented into a plurality of segmentation regions according to set sizes and types. The intensity of each of the segmentation regions may be calculated by averaging the intensities in corresponding segmentation regions. In addition, the reference value may be set so that the intensity difference between segmentation regions corresponding to each other in the reference SEM image and the defect SEM image is several to several tens percent of the corresponding segmentation region of the reference SEM image. For example, in the defect detection method of the embodiment, a reference value for generating the first segmentation image and the second segmentation image may be set to about ±10% of the intensity of the corresponding segmentation region of the reference SEM image.

The first segmentation image SI1 may include the SEM image of the segmentation region of the reference SEM image, which corresponds to the segmentation region including the defect of the defect SEM image. FIG. 2A illustrates a first segmentation image SI1 generated from the reference SEM image. The second segmentation image may include the SEM image of the segmentation region including the defect of the defect SEM image. FIG. 2B illustrates a second segmentation image SI2 generated from the defect SEM image. In FIG. 2B, a pinch defect is illustrated as an example defect D.

Referring to FIGS. 1, 2A, and 2D, after the first segmentation image SI1 and the second segmentation image SI2 are generated, the first segmentation image SI1 may be converted into an image of a first color, and the second segmentation image SI2 may be converted into an image of a second color (S130). The first color may be different from the second color, and each of them may be any one of a red color, a green color, and a blue color. For example, the first segmentation image SI1 may be converted into an image of red color, and the second segmentation image SI2 may be converted into an image of green color. In some example embodiments, an image may not be separately assigned to a channel corresponding to a blue color, or a black image may be allocated thereto. However, in other embodiments, for a more accurate analysis, the second segmentation image SI2 may be converted into two images of green color and blue color, or the first segmentation image SI1 may also be converted into two images of red color and blue color.

FIG. 2C illustrates a first color image CH, in which the first segmentation image SI1 is converted into, e.g., an image of red color, and FIG. 2D illustrates a second color image CI2, in which the second segmentation image SI2 is converted into, e.g., an image of green color. For reference, in FIGS. 2C and 2D, corresponding colors are represented by hatchings, instead of an actual color. For example, when the red color includes the first color image CI1, the red color may be represented by a hatching, in which dashed lines and straight lines are alternately arranged at a slope of about 45° with respect to each other, and when the green color includes the second color image CI2, the green color may be represented by a hatching, in which four straight lines are arranged at a certain interval at a reverse slope of about 45° with respect to each other. However, the hatchings representing the corresponding colors are not limited to the hatchings illustrated in FIGS. 2C and 2D, and may be variously changed.

Referring to FIGS. 1 and 2E, after the first segmentation image SI1 and the second segmentation image SI2 are converted into the first color image CH and the second color image CI2, a combination image may be generated by adding the first color image CH and the second color image CI2 (S140). In general, according to a color mixing theory (e.g., an additive color theory such as the Red Green Blue (GRB) color model) and/or a color mixing phenomenon, when a red color (and/or light) is mixed with a green color (and/or light), a yellow color (and/or light) may be generated. Accordingly, when a pattern portion of red color is combined with a pattern portion of green color, a corresponding pattern portion may have a yellow color. In addition, when a pattern portion of red color is combined with a space portion, a corresponding pattern portion may have a red color as is and/or, when a pattern portion of green color is combined with a space portion, a corresponding pattern portion may have a green color as is. When the second color image CI2 includes a defect D corresponding to a pinch defect, the defect D may correspond to a space, and accordingly, when the first color image CH is combined with the second color image CI2, the defect D may have a red color.

In addition, when the second color image CI2 includes a defect D corresponding to a bridge defect, a portion of the first color image CI1 corresponding to the defect D may correspond to a space. Accordingly, when the first color image CI1 is combined with the second color image CI2, the defect D may have a green color. So far, descriptions have been given of a mixing of red color and green color, but even when a blue color is added or used as a replacement for a green color, the color mixing theory or the color mixing phenomenon may also be identically (and/or equivalently) applied.

FIG. 2E illustrates a combination image COI generated by combining the first color image CH with the second color image CI2. Because the first color image CH has the red color, and the second color image CI2 has the green color, the combination image COI may generally have the yellow color. However, the example embodiments are not limited thereto, and a different color may appear in the defect D of a defect area DA represented as a square. For example, when the defect D includes a pinch defect, the defect D portion may have a red color and/or, when the defect D includes a bridge defect, the defect D portion may have a green color. For reference, in FIG. 2E, in the case of the combination image COI of yellow color, the combination image COI is illustrated by a matrix hatching, in which straight lines at a slope of about 45° and straight lines at a reverse slope of about 45° cross each other.

Referring to FIGS. 1, 2E, and 3, after the combination image is generated, the type of the defect may be classified according to colors, areas, and aspect ratios of the defect with respect to the combination image (S150). In the combination image COI of FIG. 2E, a certain area including the defect D, represented as a square, may be extracted as the defect area DA. Next, the type of the defect may be classified according to colors, areas, and aspect ratios of the defect, that appears in the defect area DA. The graph of FIG. 3 illustrates the colors of the defect in the defect area DA according to intensity based on the illustrated example. In these cases, intensity may correspond to an average intensity of pixels corresponding to the defect area DA. In addition, an aspect ratio AR of a corresponding defect D may be about 0.93, and an area A of the defect D may be about 24.28 nm². When the aspect ratio R is close to about 1, a shape of the defect D may be close to a circular shape or a rectangular shape. In addition, when the aspect ratio R is close to about 0, the shape of the defect D may have an elongated shape in a longitudinal direction or a y direction, and when the aspect ratio R is further away from 1, the shape of the defect D may have an elongated shape in a traverse direction, or an x direction.

In the graph of FIG. 3, when the intensity of the red color is high, the defect D may correspond to a pinch defect, and when the intensity of the green color is high, the defect D may correspond to a bridge defect. Accordingly, the graph of FIG. 3 illustrates that the defect D corresponds to the pinch defect, in which the defect D has a circular shape or a rectangular shape. On the other hand, as described above, the pinch defect may include a thinning defect, and the bridge defect may include a fat defect. In addition, the color of the defect may be obtained as an average intensity in the defect D or the defect area DA, and the area and the aspect ratio of the defect may be calculated in units of the defect D or the defect area DA. For reference, in FIG. 2E, the defect area DA is relatively set wider than the defect D, but as illustrated in FIGS. 4A through 4E, the defect area DA may be set in a very narrow area adjacent to the defect D.

In some example embodiments, after the types of the defect are classified, a reference defect image having a pattern of a particular color in response to the defect of the corresponding type may be generated. For example, patterns of the colors illustrated on the right side of FIGS. 4A through 4E may correspond to the reference defect images representing the corresponding defect. In response to various types of the defect, a process of generating a reference defect image having a pattern of a particular color is described in more detail with reference to FIGS. 4A through 4E.

After the types of the defect are classified, the defect detection model may be generated by receiving the combination image as an input and using the type of the defect as an output, and by using deep learning (S160). For example, to generate the defect detection model, deep learning may be performed by using a Generative Adversarial Network (GAN) algorithm. In deep learning by using a GAN algorithm, various combination images may be input, and the types of the defect corresponding to the combination images may be output. Generation of the defect detection model is described in more detail with reference to FIG. 5.

After the defect detection model is generated, by applying the SEM image and the reference SEM image of the inspection semiconductor element to the defect detection model, a defect may be detected (S170). In this case, the inspection semiconductor element may include a mass production semiconductor element, and may actually mean a semiconductor element, for which detection of the defect and/or prediction of the type of defect are required. The SEM image of the inspection semiconductor element may correspond to the defect SEM image of the learning semiconductor element described above. In addition, the reference SEM image may be substantially similar and/or identical to the reference SEM image of the learning semiconductor element.

When the SEM image and the reference SEM image of the inspection semiconductor element are applied to the defect detection model, a defect image may be generated by a defect image generation model of the defect detection model. In addition, the type of defect may be determined by comparing the defect image to the reference defect images by using a defect type determination model of the defect detection model. On the other hand, the SEM image and the reference SEM image of the inspection semiconductor element may not be directly applied to the defect detection model, but after passing through a process substantially similar and/or identical to the process of generating the combination image for the learning semiconductor element described above, the combination image of the inspection semiconductor element may be applied to the defect detection model. In some example embodiments, in operation S170 of detecting a defect, detection of the defect may include not only detection of the defect itself but prediction of the type of the defect. In other words, operation S170 of detecting the defect may not only detect the defect by using the combination image itself, but predict the type of the defect by using the defect detection method. Generation of the defect image and determination of the type of the defect are described in more detail with reference to FIG. 5, and application of the SEM image and the reference SEM image of the inspection semiconductor element to the defect detection model is described in more detail with reference to FIG. 6.

The defect detection method of the example embodiments may promptly and accurately detect the defect and predict the type of the defect for various defects of a semiconductor element, by obtaining the reference SEM image and the defect SEM image, generating the first segmentation image and the second segmentation image, respectively converting the two images into an image of the first color and an image of the second color, generating the combination image, classifying the type of the defect, and generating the defect detection model by using deep learning and detecting the defect of the semiconductor element by using a defect detection process using the defect detection model. The semiconductor element may be, for example, two-terminal devices (like diodes), three-terminal devices (like rectifiers), four-terminal devices (like optocouplers), and/or may be (and/or include) electronic components of other types mimicking and/or coupled to semiconductor devices (e.g., microelectromechanical systems (MEMS), resistors, capacitors, integrated cells, etc.), and/or the like. In some example embodiments, the defect detection method may be used to detect and identify defects of a manufactured semiconductor element, and may, for example, be used to identify semiconductor element for further processing (e.g., corrective processing), and/or, e.g., in the case wherein the defect is of a type that cannot be readily or efficiently corrected, for removal from production.

In some example embodiments, the defect detection method may be performed by processing circuitry such hardware, software, or the combination of hardware and software. For example, the processing circuitry more specifically may include (and/or be included in), but is not limited to, a processor (and/or processors), Central Processing Unit (CPU), a controller, an arithmetic logic unit (ALU), a digital signal processor, a microcomputer, a field programmable gate array (FPGA), a System-on-Chip (SoC), a programmable logic unit, a microprocessor, application-specific integrated circuit (ASIC), neural processing unit (NPU), graphics processing unit (GPU), etc.

In some example embodiments, the defect detection method may use two colors among three colors of a red/green/blue (RGB) channel as an image of the first color and an image of the second color, and use the color mixing phenomenon to detect the defect. In addition, by determining the type of the defect by using deep learning based on a GAN algorithm, the type of the defect may be predicted promptly and accurately.

FIGS. 4A through 4E are plan views and graphs illustrating a process of generating various defects of the semiconductor element into reference defect images, by using an operation of generating the combination image and an operation of classifying the type of the defect in the defect detection method of FIG. 1. Of the images in each of FIGS. 4A through 4E, a left image illustrates a combination image (or a portion of the combination image), a middle graph illustrates a color, an area, and an aspect ratio of a defect area, and a right image illustrates a reference defect image representing the type of the defect. Duplicate descriptions already given with reference to FIGS. 1 through 3 are briefly given or omitted.

Figure 4A:
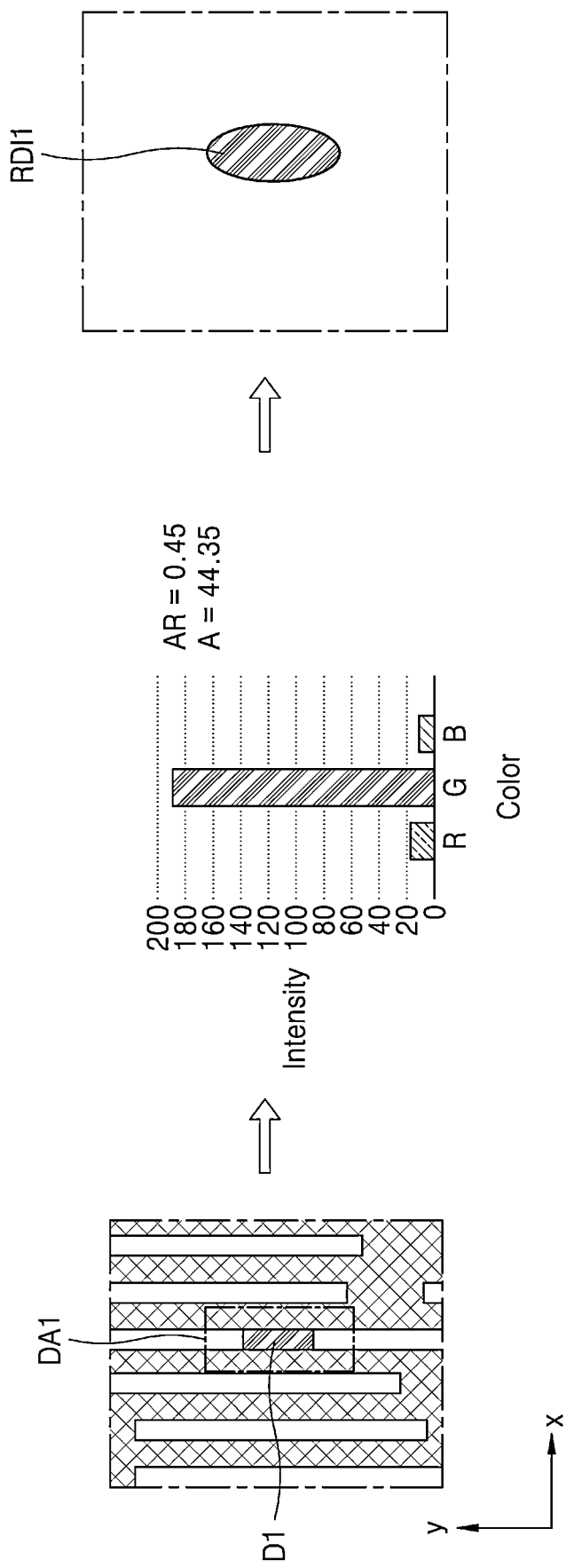
FIGS. 4A through 4E are plan views and graphs illustrating processes of generating various defects of a semiconductor element into reference defect images, by using an operation of generating a combination image and an operation of classifying the type of a defect, in the defect detection method of FIG. 1.

Referring to FIG. 4A, a first defect D1 of a first defect area DA1 may correspond to a bridge defect, as seen from the combination image on the left and the graph in the middle. As shown in FIG. 4A, there may be a portion in which adjacent patterns are attached to each other, and, in the second color image, the green color of the attached portion of the second color image in the combination image on the left may appear as the first defect D1. In addition, as seen from the type of the defect of the combination image on the left and the aspect ratio of the middle graph, the first defect D1 may have an elongated shape in a second direction (e.g., the y direction). Characteristics of the first defect D1 may be represented by a first reference defect image RDI1 having a pattern of the same color as the right image. For example, the first defect D1 may be represented by the first reference defect image RDI1 having an elliptical pattern, of green color, elongated in the second direction (Y direction). However, the example embodiments are not limited thereto and, for example, the color and shape of the pattern of the first reference defect image RDI1 may be differently set according to users.

Figure 4B:
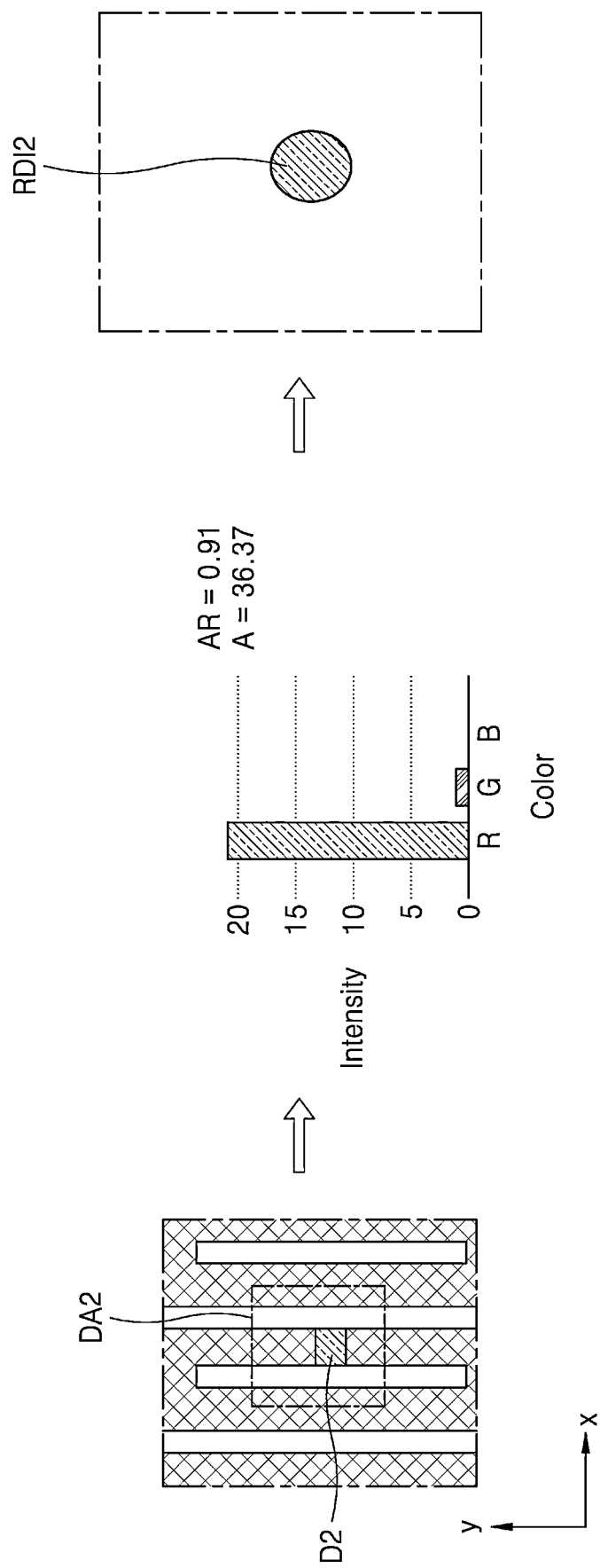

Referring to FIG. 4B, a second defect D2 of a second defect area DA2 may correspond to a pinch defect, as seen from the combination image on the left and the middle graph. As illustrated in FIG. 4B, there may be a portion in which a pattern is broken, and, in the second color image, the red color of the first color image corresponding to a broken portion of the second color image in the combination image on the left may appear as the second defect D2. In addition, as seen from the type of the defect of the combination image on the left and the aspect ratio of the middle graph, the second defect D2 may have a shape close to a rectangular shape or a circular shape. Characteristics of the second defect D2 may be represented by a second reference defect image RDI2 having a pattern of the same color as the right image. For example, the second defect D2 may be represented by a second reference defect image RDI2 having a circular shape. In some example embodiments, the type of color and shape of the pattern of the second reference defect image RD12 may also be differently assigned according to users.

Figure 4C:
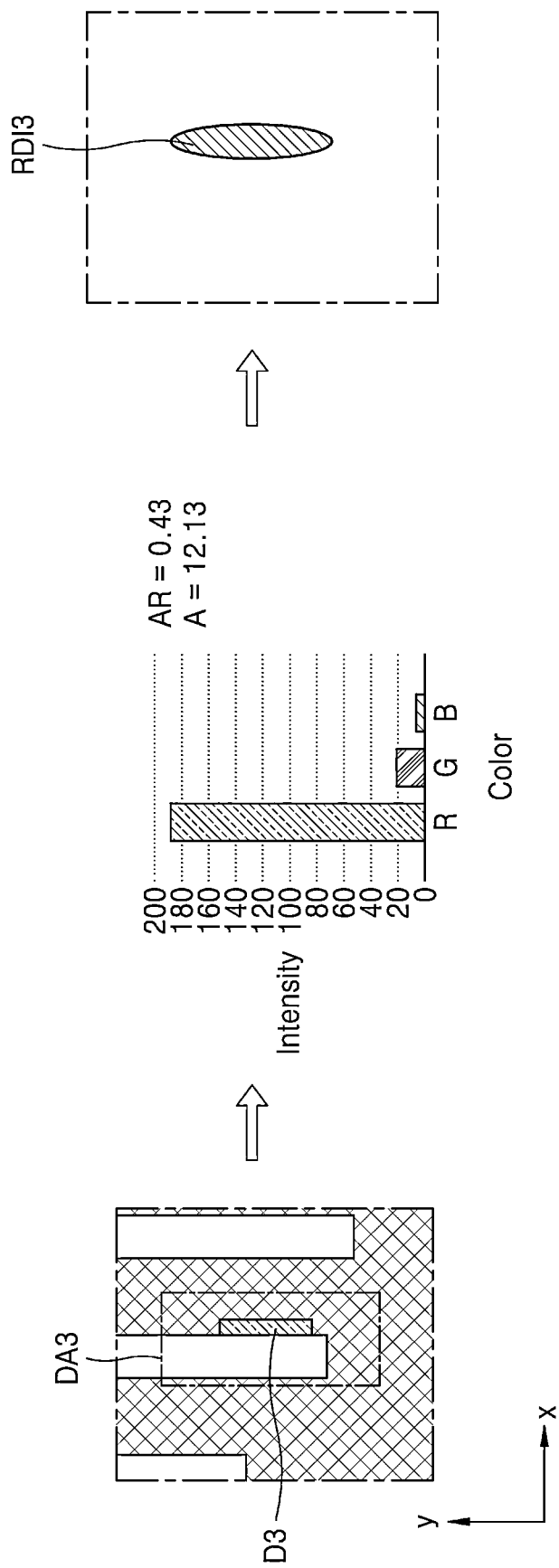

Referring to FIG. 4C, a third defect D3 of a third defect area DA3 may correspond to a thinning defect, as seen from the combination image on the left and the middle graph. As illustrated in FIG. 4C, there may be a portion in which a certain portion of a pattern is thinned, in the second color image, and the red color of a portion of the first color image corresponding to a thinned portion of the second color image in the combination image on the left may appear as the third defect D3. In addition, as seen from the type of the defect of the combination image on the left and the aspect ratio of the middle graph, the third defect D3 may have an elongated shape in the second direction (e.g., the y direction). Characteristics of the third defect D3 may be represented by a third reference defect image RDI3 having a pattern of the same color as the right image. For example, the third defect D3 may be represented by the third reference defect image RDI3 having an elliptical pattern, of blue color, elongated in the second direction (e.g., the y direction). In some example embodiments, the type of color and shape of the pattern of the third reference defect image RDI3 may be differently assigned according to users.

Figure 4D:
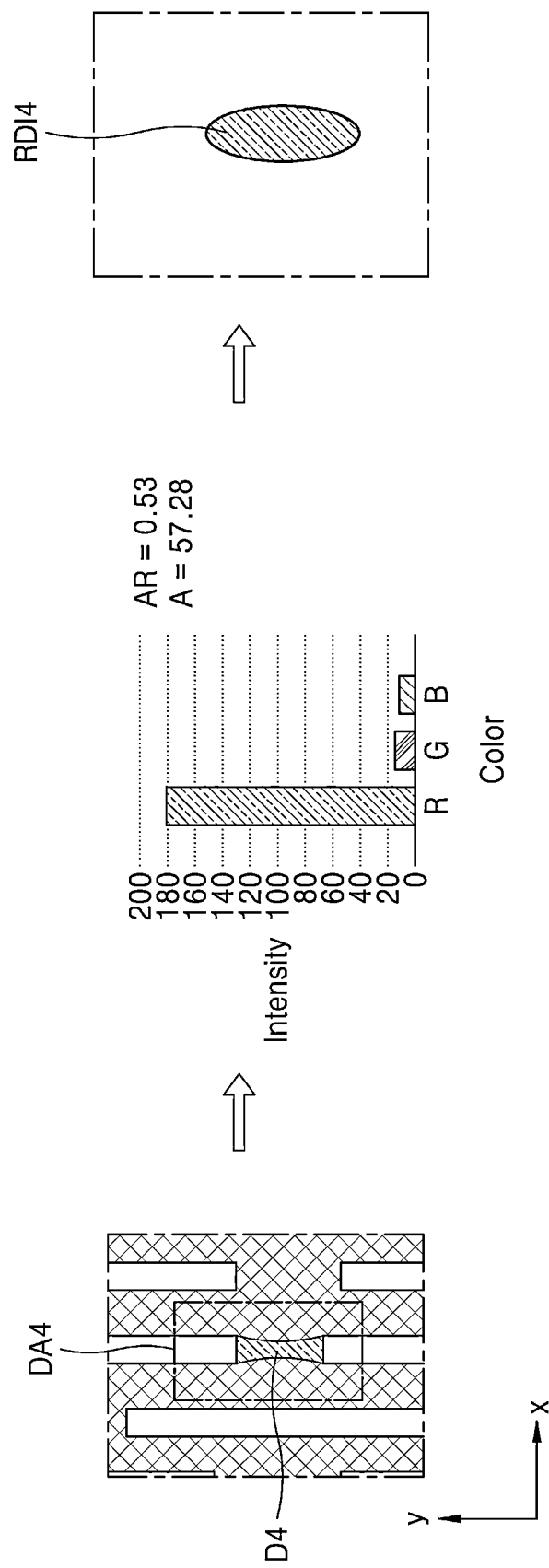

Referring to FIG. 4D, a fourth defect D4 of a fourth defect area DA4 may correspond to a pinch defect, as seen from the combination image on the left and the middle graph. As illustrated in FIG. 4D, there may be a portion in which a pattern is broken in the second color image, and the red color of a portion of the first color image corresponding to a broken portion of the second color image in the combination image on the left may appear as the fourth defect D4. In addition, as seen from the type of the defect of the combination image on the left and the aspect ratio of the middle graph, the fourth defect D4 may have an elongated shape in the second direction (e.g., the y direction). Characteristics of the fourth defect D4 may be represented by a fourth reference defect image RDI4 having a pattern of the same color as the right image. For example, the fourth defect D4 may be represented by the fourth reference defect image RDI4 having an elliptical pattern, of red color, elongated in the second direction (e.g., the y direction). The type of color and shape of the pattern of the fourth reference defect image RDI4 may be differently assigned according to users.

In addition, the shape of the pinch defect of the fourth defect D4 in FIG. 4D may have a shape, in which the middle portion thereof is thin in the second direction (e.g., the y direction). Accordingly, the shape of the pinch defect of the fourth defect D4 in FIG. 4D may have a different shape from a pinch defect having a general rectangular shape. In this manner, when the shapes of the pinch defects are different from each other while the aspect ratios thereof are identical, the pinch defects may be differentiated from each other by being represented by different reference defect images.

Figure 4E:
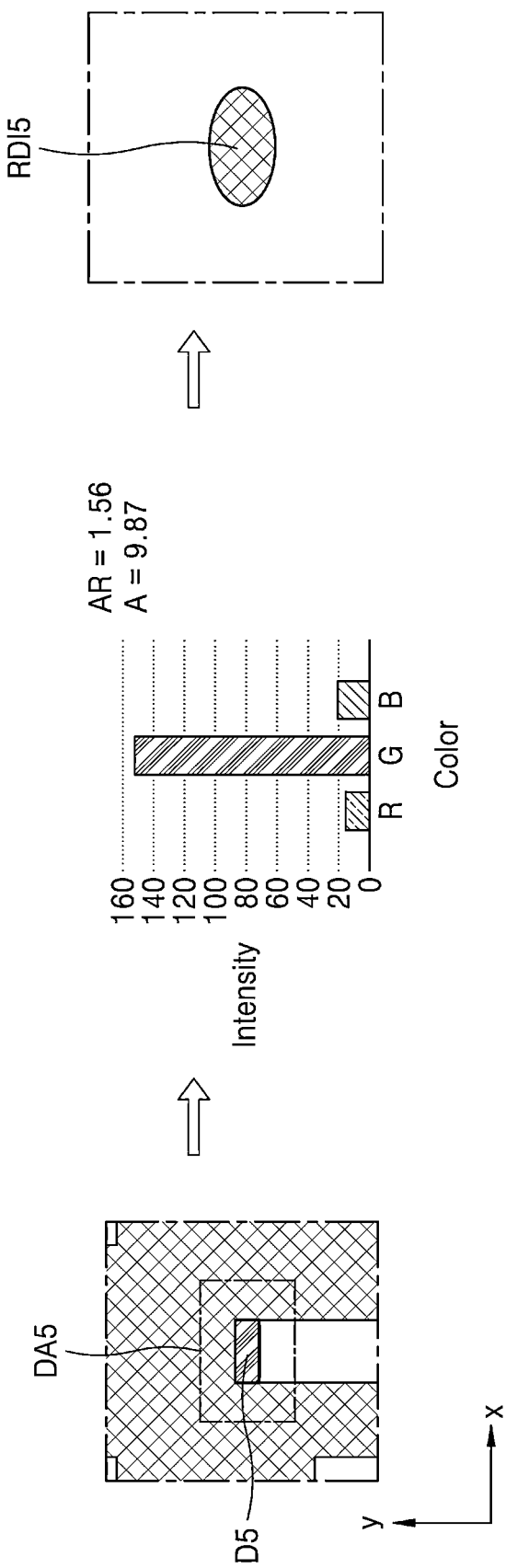

Referring to FIG. 4E, a fifth defect D5 of a fifth defect area DA5 may correspond to a fat defect, as seen from the combination image on the left and the middle graph. As illustrated in FIG. 4E, there may be a remaining portion, in which a portion of the pattern in the second color image is not removed but remains, and the green color of the remaining portion of the second color image in the combination image on the left may appear as the fifth defect D5. In addition, as seen from the type of the defect of the combination image on the left and the aspect ratio of the middle graph, the fifth defect D5 may have an elongated shape in a first direction (e.g., the x direction). Characteristics of the fifth defect D5 may be represented by a fifth reference defect image RDI5 having a pattern of the same color as the right image. For example, the fifth defect D5 may be represented by the fifth reference defect image RDI5 having an elliptical pattern, of yellow color, elongated in the first direction (e.g., the x direction). Of course, the type of color and shape of the pattern of the fifth reference defect image RDI5 may be differently set according to users.

So far, processes of generating the reference defect image for the five kinds of defects have been exemplarily described. However, there may be more various types of defects in the semiconductor element, and such various defects may be represented by reference defect images having patterns of colors corresponding thereto.

Figure 5:
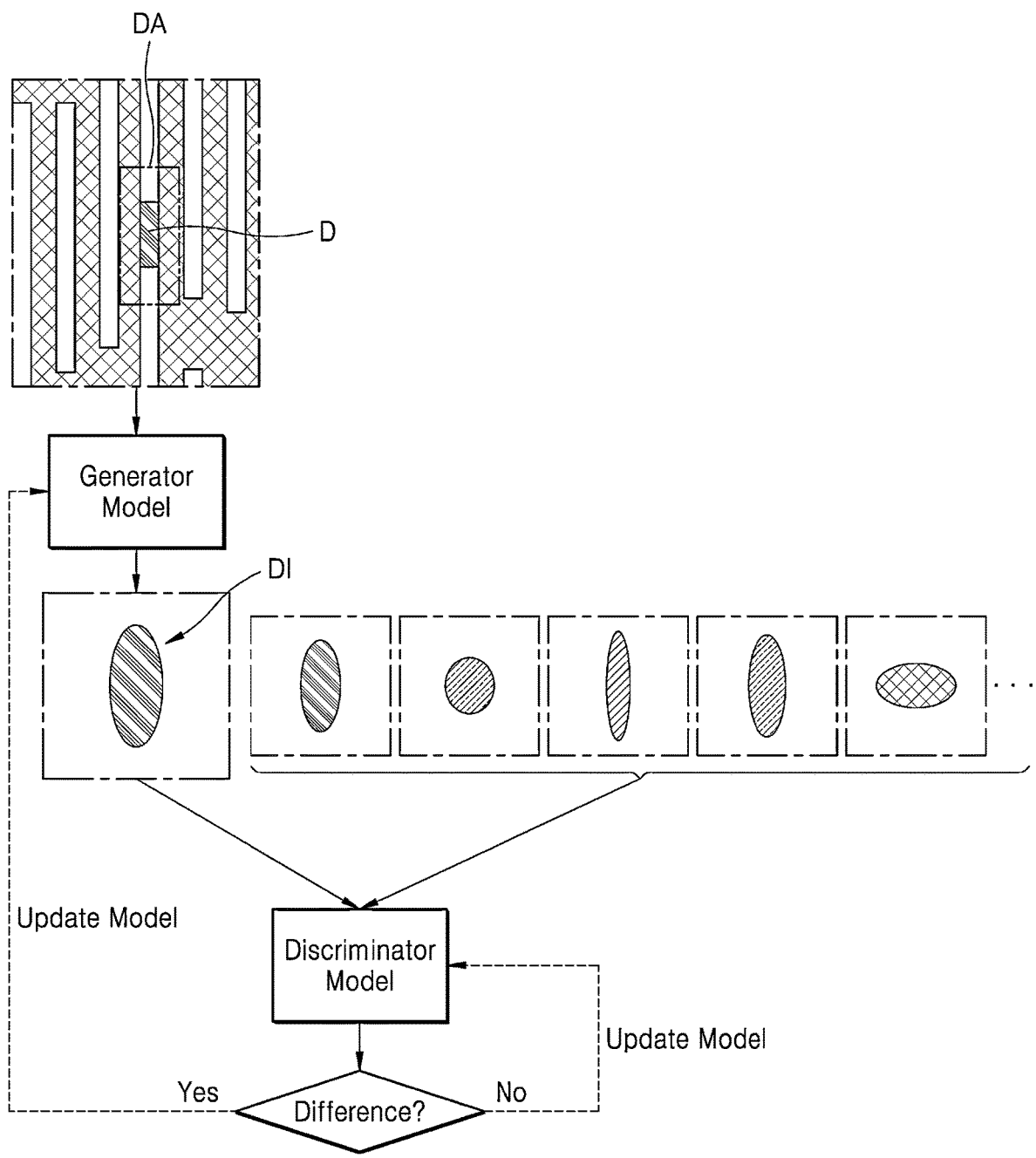
FIG. 5 is a schematic conceptual diagram of a process of deep learning based on a generative adversarial network (GAN) algorithm of an operation of generating a defect detection model, in the defect detection method of FIG. 1.

FIG. 5 is a schematic conceptual diagram of a process of deep learning based on a generative adversarial network (GAN) algorithm of an operation of generating a defect detection model, in the defect detection method of FIG. 1. Duplicate descriptions already given with reference to FIGS. 1 through 4E are briefly given or omitted.

Referring to FIG. 5, the defect detection method of the embodiment may perform deep learning based on a GAN algorithm for generating the defect detection model, in operation S160 of generating a defect detection model. The GAN algorithm may include a deep learning-based generative algorithm, and may include two sub-models. For example, the GAN algorithm may include a generator model and a discriminator model. The generator model may generate new examples, and the discriminator model may determine whether an input example is actual data, or fake data generated by the generator model. The generator model may, in the defect detection method of some example embodiments, correspond to a defect image generation model generating a defect image corresponding to a defect, and the discriminator model may correspond to a defect type determination model determining the type of a defect.

For example, in relation with the defect detection method of some example embodiments, a combination image may be input to the generator model. The generator model may generate and output a defect image having a pattern of color corresponding to a defect, based on the color, an area, and the aspect ratio of a defect of an input combination image.

In some example embodiments, the defect image generated by the generator model and reference defect images may be input to the discriminator model. The discriminator model may compare the defect image to the reference defect images, and analyze differences therebetween by finding the reference defect image corresponding to the defect image. When the reference defect image corresponding to the defect image is not found or there is a difference between the defect image and the reference defect image corresponding to the defect image, the generator model may be updated and the same process may be performed again. In addition, in the discriminator model, when the difference is not found in the reference defect image corresponding to the defect image, the discriminator model may be updated to find the difference, and the same process may be performed again. When a difference between the defect image and the reference defect image corresponding thereto is no longer found in the discriminator model, by continuously updating the generator model and the discriminator model, the defect detection model including the corresponding generator model and discriminator model may be determined and generated.

In FIG. 5, when the combination image including the first defect D1 similar to an example illustrated in FIG. 4A is input to the discriminator model, a defect image DI having a pattern of a color corresponding to the defect, based on the color, the area, and the aspect ratio of the defect in the generator model, may be generated and output. Thereafter, the defect image DI and various reference defect images including the first through fifth reference defect images RDI1 through RDI5 in FIGS. 4A through 4E as described above may be input to the discriminator model. In the discriminator model, the reference defect image corresponding to the defect image DI among the reference defect images may be found and extracted.

In addition, the discriminator model may determine whether the defect image DI is the same as the extracted reference defect image. For example, the discriminator model may determine whether there is a difference between the defect image DI and the extracted reference defect image, or there is no difference therebetween. In general, in deep learning using a GAN algorithm, such a determination process may also be described as a process of determining fake or real. Thereafter, according to the determination result, the generator model and the discriminator model may be continuously updated. For example, when there is a difference (Yes), the generator model may be updated, and when there is no difference (No), the discriminator model may be updated. In some example embodiments, even when the reference defect image corresponding to the defect image DI is not found at all, updating of the generator model may be proceeded, similar to the case when there is a difference. When, after continuously repeating the processes described above, the discriminator model reaches a level at which the difference between the defect image DI and the extracted reference defect image is no longer found, the deep learning may be terminated, and the generator model at this time point may be selected as a final defect image generation model. In the cases of the defect type determination model, which is a discriminator model, a function of searching for the reference defect image corresponding to the generated defect image may be performed, and a function of searching for a difference may not be further performed.

To help understanding somewhat more about an operation of the GAN algorithm, it is assumed that the generator model is a counterfeiter, and the discriminator model is an investigator. The counterfeiter may need to make counterfeited money indistinguishable from real money, and the investigator may need to distinguish well the real money from the counterfeited money. Accordingly, the counterfeiter and the investigator may compete against each other, and from an aspect of a game theory, the counterfeiter and the investigator may be adversarial to each other, and the competition may have an effect of playing a zero-sum game.

For example, when the investigator successfully distinguishes the counterfeited money from the real money, the investigator may not need to update parameters thereof for distinguishing. However, the counterfeiter may need to update at least one and/or many parameters thereof for counterfeiting. Similarly, when the counterfeiter successfully makes the counterfeited money and the investigator does not distinguish the counterfeited money from the real money, the counterfeiter may not need to update the parameters thereof for counterfeiting. However, the investigator may need to update at least one and/or many parameters thereof. When, after continuously repeating the processes described above, the counterfeiting reaches a level at which the investigator may no longer distinguish the counterfeiting, and a counterfeiting method may be selected as a final generator model, for example, the defect image generation model.

In some example embodiments, when, after the defect detection model is generated, the combination image of the inspection semiconductor element to be inspected is input to the defect detection model, the defect of the inspection semiconductor element may be automatically detected, and the type of the defect may be predicted. In other words, when the combination image of the inspection semiconductor element is input to the defect detection model, an inspection defect image may be generated by the defect image generation model, and in the defect type determination model, the reference defect image matching the inspection defect image may be searched for and extracted. The extracted reference defect image may, as described given with reference to FIGS. 4A through 4E, represent the defect of a particular type. Accordingly, it may be possible to predict that there is a defect in the inspection defect image and the combination image corresponding thereto, or the semiconductor element, and in addition, the defect corresponds to a defect of a particular type representing the extracted reference defect image.

Though the GAN is provided as an example neural network for deep learning models, the example embodiments are not limited thereto. The deep learning model may include, for example, at least one of CNN (Convolution Neural Network), R-CNN (Region with Convolution Neural Network), RPN (Region Proposal Network), RNN (Recurrent Neural Network), S-DNN (Stacking-based deep Neural Network), S-SDNN (State-Space Dynamic Neural Network), Deconvolution Network, DBN (Deep Belief Network), RBM (Restricted Boltzmann Machine), Fully Convolutional Network, LSTM (Long Short-Term Memory) Network, Classification Network and BNN (Bayesian Neural Network).

Additionally (and/or alternatively), the deep learning model(s) may be trained based on at least one of various algorithms such as regression, linear and/or logistic regression, random forest, a support vector machine (SVM), and/or other types of models, such as statistical clustering, Bayesian classification, decision trees, dimensionality reduction such as principal component analysis, expert systems, and/or combinations thereof including ensembles such as random forests.

FIG. 6 is a flowchart of further subdivided operations of an operation of detecting a defect, in the defect detection method of FIG. 1. Descriptions have been provided with reference to FIG. 1 together, and duplicate descriptions already given with reference to FIGS. 1 through 5 are briefly given or omitted.

Referring to FIG. 6, in the defect detection method, operation S170 of detecting a defect may be subdivided as the following. Firstly, the SEM image of the inspection semiconductor element may be obtained (S171). In this case, the inspection semiconductor element may, as described above, include a mass production semiconductor element, and may actually mean a semiconductor element, for which detection of a defect and/or prediction of the type of the defect are required.

Next, a third segmentation image may be generated from the SEM image of the inspection semiconductor element (S173). The third segmentation image may be substantially the same as the second segmentation image, except that the third segmentation image is generated from the SEM image of the inspection semiconductor element instead of a learning semiconductor element. In other words, the segmentation image may mean the SEM image of the segmentation region, in which the intensity difference between the reference SEM image and the SEM image of the inspection semiconductor element is higher than a set reference value. In addition, the third segmentation image may include the SEM image of the segmentation image including the defect in the SEM image of the inspection semiconductor element. In some example embodiments, the reference SEM image of the inspection semiconductor element and the first segmentation image generated therefrom may have already been generated. For example, the first segmentation image of the inspection semiconductor element may be substantially the same as the reference SEM image of the learning semiconductor element described above and the first segmentation image generated therefrom.

Thereafter, the third segmentation image may be converted into an image of the second color (S175). For example, the second color may include a green color. In addition, the first segmentation image may be converted into an image of a first color, and the first color may include, for example, a red color. However, the second color and the first color may not be limited to a green color and a red color, respectively.

Next, an inspection combination image may be generated by combining the image of the second color with the image of the first color (S177). When the second color includes a green color, and the first color includes a red color, as described in the case of the learning semiconductor element, a yellow color may appear in most portions of the inspection combination image except for the defect portion. However, in the case of the defect portion, according to the type of the defect, the first color or the second color may appear, and in addition, various areas and aspect ratios may be realized.

Thereafter, the type of the defect may be predicted by inputting the inspection combination image to the defect detection model (S179). In the inspection combination image, a defect region including the defect portion may be extracted, and the defect region may be input to the defect detection model. When the defect region is input to the defect detection model, the inspection defect image may be generated by the defect image generation model of the defect detection model, and the reference defect image corresponding thereto in the defect type determination model of the defect detection model may be searched for and extracted. As a result, the defect may be extracted from the inspection combination image and the inspection semiconductor element corresponding thereto, and the defect may be predicted as corresponding to the defect of the particular type, which is represented by the extracted reference defect image.

FIG. 7 is a schematic flowchart of a process of a semiconductor element manufacturing method including a defect detection method, according to an example embodiment. Descriptions have been provided with reference to FIGS. 1 and 6, and duplicate descriptions already given with reference to FIGS. 1 through 6 are briefly given or omitted.

Referring to FIG. 7, in the semiconductor element manufacturing method including the defect detection method according to an embodiment (hereinafter, simply referred to as 'semiconductor element manufacturing method'), operation S210 of obtaining a reference SEM image and a defect SEM image through operation S270 of detecting a defect by applying the defect detection model may be sequentially performed. Operation S210 of obtaining a reference SEM image and a defect SEM image through operation S270 of detecting a defect by applying the defect detection model may be the same as described with reference to FIGS. 1 through 6.

Thereafter, a correlation relationship between the detected defect and process variables of the semiconductor process may be analyzed (S280). For example, the correlation relationship between the type of each detected defect and the process variables in the process of manufacturing a semiconductor element may be analyzed. The semiconductor element may have various types of patterns, and a pattern of the semiconductor element may be formed by transferring the pattern on a mask on a wafer by using an exposure process. In addition, to form the pattern of the semiconductor element, various semiconductor processes, for example, a development process, an etching process, a cleaning process, a heat treatment process, a baking process, or the like, in addition to an exposure process, may be performed. In each of the semiconductor processes, various process variables may be applied, and various defects may occur on the pattern of the semiconductor element due to applying incorrect process variables.

Accordingly, to prevent and/or reduce an occurrence of a defect, the process variables may need to be appropriately changed, and in addition, to change such process variables, the correlation relationship between detected types of defects and the process variables may need to be analyzed. For example, in some embodiments, the correlation relationship between the defect and process variables, may be used to determine a probability that a design and/or mask will result in a defect and the type of defect. In some embodiments, the variable corresponding to the defect may be identified and a solution may be provided.

After an analysis of the correlation relationship, the process variables may be changed based on the correlation relationship, a corresponding semiconductor process may be performed, and/or a semiconductor element may be manufactured (S290). For example, by changing the process variables corresponding to a cause of the defect, and performing the corresponding semiconductor processes by applying the changed process variables, an occurrence of the defect may be prevented or minimized. In some example embodiments, the modified process may be additionally confirmed before the semiconductor element is manufactured.

While the inventive concepts have been particularly shown and described with reference to embodiments thereof, it will be understood that various changes in form and details may be made therein without departing from the spirit and scope of the following claims.

What is claimed is:

1. A deep learning-based defect detection method for a semiconductor element, the defect detection method comprising:
generating a first segmentation image from a reference scanning electron microscope (SEM) image without a defect and a second segmentation image from a defect SEM image with the defect, with respect to a learning semiconductor element;
converting the first segmentation image into an image of a first color among a red color, a green color, or a blue color, and converting the second segmentation image into an image of a second color, different from the first color, among the red color, the green color, or the blue color;
generating a combination image by adding the image of the first color and the image of the second color;
classifying a type of the defect in the learning semiconductor element according to at least one among a color and an aspect ratio of the defect, with respect to the combination image;
generating, using deep learning, a defect detection model using the combination image as an input and the type of the defect as an output; and
detecting a defect in an inspection semiconductor element by applying an SEM image of the inspection semiconductor element and the reference SEM image to the defect detection model,
wherein the first segmentation image and the second segmentation image correspond to SEM images of a segmentation region, in which an intensity difference between the reference SEM image and the defect SEM image is higher than a reference value.

2. The defect detection method of claim 1, wherein
the first color comprises the red the reference SEM image comprises an SEM image of a learning semiconductor element without a defect, and the defect SEM image comprises an SEM image of a learning semiconductor element with a defect color and the second color comprises the green color,
a portion of the combination image without the defect appears as a yellow color, and
a portion of the combination image with the defect appears as one of the first color or the second color.

3. The defect detection method of claim 2, wherein
when the portion of the combination image appears as the first color the defect corresponds to a pinch defect in which a pattern is broken, and
when the portion of the combination image appears as the second color the defect corresponds to a bridge defect in which adjacent patterns are attached to each other.

4. The defect detection method of claim 1, wherein the classifying the type of the defect includes considering and classifying an area associated with the defect and the defect together.

5. The defect detection method of claim 1, wherein the deep learning uses a generative adversarial network (GAN) algorithm.

6. The defect detection method of claim 5, wherein
the classifying of the type of the defect in the learning semiconductor element comprises a process of generating a reference defect image for a plurality of types of defects, and
the defect detection model comprises
a defect image generation model configured to generate the defect in the learning semiconductor element into a defect image based on the color and the aspect ratio of the defect in the combination image, and
a defect type determination model configured to determine the type of the defect in the learning semiconductor element by comparing the generated defect image to the reference defect image.

7. The defect detection method of claim 6, wherein the detecting of the defect in the inspection semiconductor element comprises:
generating a defect image for the inspection semiconductor element using the defect image generation model, and
determining the type of the defect in the inspection semiconductor element by comparing the defect image for the inspection semiconductor element to the reference defect image using the defect type determination model.

8. The defect detection method of claim 1, wherein the classifying of the at least one type of defect comprises performing a process of extracting a defect region, the defect region comprising a region of the combination image including the defect.

9. The defect detection method of claim 1, wherein the detecting of the defect in the inspection semiconductor element comprises:
generating a third segmentation image from the SEM image of the inspection semiconductor element;
converting the third segmentation image into an image of the second color;
generating an inspection combination image by adding the image of the second color of the third segmentation image and an image of the first color based on a reference SEM image of the inspection semiconductor element without the defect; and
inputting the inspection combination image to the defect detection model and predicting the type of the defect.

10. The defect detection method of claim 9, wherein the predicting of the type of the defect in the inspection semiconductor element comprises:
extracting a defect region from the inspection combination image, and
inputting the extracted defect region to the defect detection model.

11. A deep learning-based defect detection method for a semiconductor element, the defect detection method comprising:
obtaining a reference scanning electron microscope (SEM) image without a defect and a defect SEM image with the defect, with respect to a learning semiconductor element;
generating a first segmentation image of the reference SEM image and a second segmentation image of the defect SEM image, which correspond to a segmentation region in which an intensity difference between the reference SEM image and the defect SEM image is higher than a reference value;
converting the first segmentation image into an image of a first color among a red color, a green color, or a blue color, and converting the second segmentation image into an image of a second color, different from the first color, among the red color, the green color, or the blue color;
generating a combination image by adding the image of the first color and the image of the second color;

classifying a type of the defect in the learning semiconductor element according to a color, an area, and an aspect ratio of the defect, with respect to the combination image;

generating, using a deep learning, a defect detection model based on a generative adversarial network (GAN) algorithm using the combination image as an input and the type of the defect as an output; and detecting a defect in an inspection semiconductor element by applying an SEM image of the inspection semiconductor element and the reference SEM image to the defect detection model.

12. The defect detection method of claim 11, wherein
the first color comprises the red color and the second color comprises the green color,
a portion of the combination image without the defect appears as a yellow color, and
a portion of the combination image with the defect appears as one of the first color or the second color.

13. The defect detection method of claim 11, wherein the classifying of the type of the defect in the learning semiconductor element comprises generating a reference defect image for a plurality of types of defects, and
the defect detection model comprises
a defect image generation model configured to generate the defect in the learning semiconductor element into a defect image based on a color, an area, and an aspect ratio of the defect, in the combination image, and
a defect type determination model configured to determine the type of the defect in the learning semiconductor element by comparing the generated defect image to the reference defect image.

14. The defect detection method of claim 13, wherein the detecting of the defect in the inspection semiconductor element comprises:
generating a third segmentation image from the SEM image of the inspection semiconductor element;
converting the third segmentation image into an image of the second color;
generating an inspection combination image by adding the image of the second color converted from the third segmentation image and an image of the first color based on a reference SEM image of the inspection semiconductor element without the defect;
extracting a defect region from the inspection combination image; and
inputting the defect region to the defect detection model and predicting the type of the defect.

15. The defect detection method of claim 14, wherein predicting of the type of the defect in the inspection semiconductor element comprises:
generating an inspection defect image in the defect image generation model based on the defect in the inspection semiconductor element, and
determining the type of the defect in the inspection semiconductor element by comparing the inspection defect image to the reference defect image in the defect type determination model.

16. A semiconductor device manufacturing method comprising:
obtaining a reference scanning electron microscope (SEM) image without a defect and a defect SEM image with a defect, with respect to a learning semiconductor element;
generating a first segmentation image of the reference SEM image and a second segmentation image of the defect SEM image, which correspond to a segmentation region in which an intensity difference between the reference SEM image and the defect SEM image is higher than a set reference value;
converting the first segmentation image into an image of a first color among a red color, a green color, or a blue color, and converting the second segmentation image into an image of a second color, different from the first color, among the red color, the green color, or the blue color;
generating a combination image by adding the image of the first color and the image of the second color;
classifying a type of the defect in the learning semiconductor element according to a color, an area, and an aspect ratio of the defect, with respect to the combination image;
generating, using deep learning, a defect detection model based on a generative adversarial network (GAN) algorithm using the combination image as an input and the type of the defect as an output;
detecting a defect in an inspection semiconductor element by applying an SEM image of the inspection semiconductor element and the reference SEM image to the defect detection model;
analyzing a correlation relationship between the detected defect and process variables of a semiconductor process;
changing, based on the correlation relation, at least one of the process variables causing the defect; and
manufacturing the semiconductor element based on the changed process variables.

17. The semiconductor device manufacturing method of claim 16, wherein
the first color comprises a red color and the second color comprises a green color,
a portion of the combination image without the defect appears as a yellow color, and
a portion of the combination image with the defect appears as one of the first color or the second color, such that the first color corresponds to a pinch defect comprising a broken pattern, and the second color corresponds to a bridge defect comprising adjacent patterns attached to each other.

18. The semiconductor device manufacturing method of claim 16, wherein the defect detection model comprises:
a defect image generation model configured to generate the defect in the learning semiconductor element into a defect image based on a color, an area, and an aspect ratio of the defect, in the combination image, and
a defect type determination model configured to determine the type of the defect in the learning semiconductor element by comparing the generated defect image to a reference defect image.

19. The semiconductor device manufacturing method of claim 18, wherein the detecting of the defect in the inspection semiconductor element comprises:
generating a third segmentation image from the SEM image of the inspection semiconductor element;
converting the third segmentation image into an image of the second color;
generating an inspection combination image by adding the image of the second color of the third segmentation image and an image of the first color based on a reference SEM image of the inspection semiconductor element without the defect;
extracting a defect region from the inspection combination image; and inputting the defect region to the defect detection model and predicting the type of the defect in the inspection semiconductor element.

20. The semiconductor device manufacturing method of claim 19, wherein the predicting of the type of the defect in the inspection semiconductor element comprises:
generating the defect in the inspection semiconductor element as an inspection defect image in the defect image generation model, and
determining the type of the defect in the inspection semiconductor element by comparing the inspection defect image to the defect SEM image in the defect type determination model, and
wherein the analyzing of the correlation relationship comprises analyzing the correlation relationship between the type of the defect in the inspection semiconductor element and the process variables.

* * * * *